Patented June 20, 1950

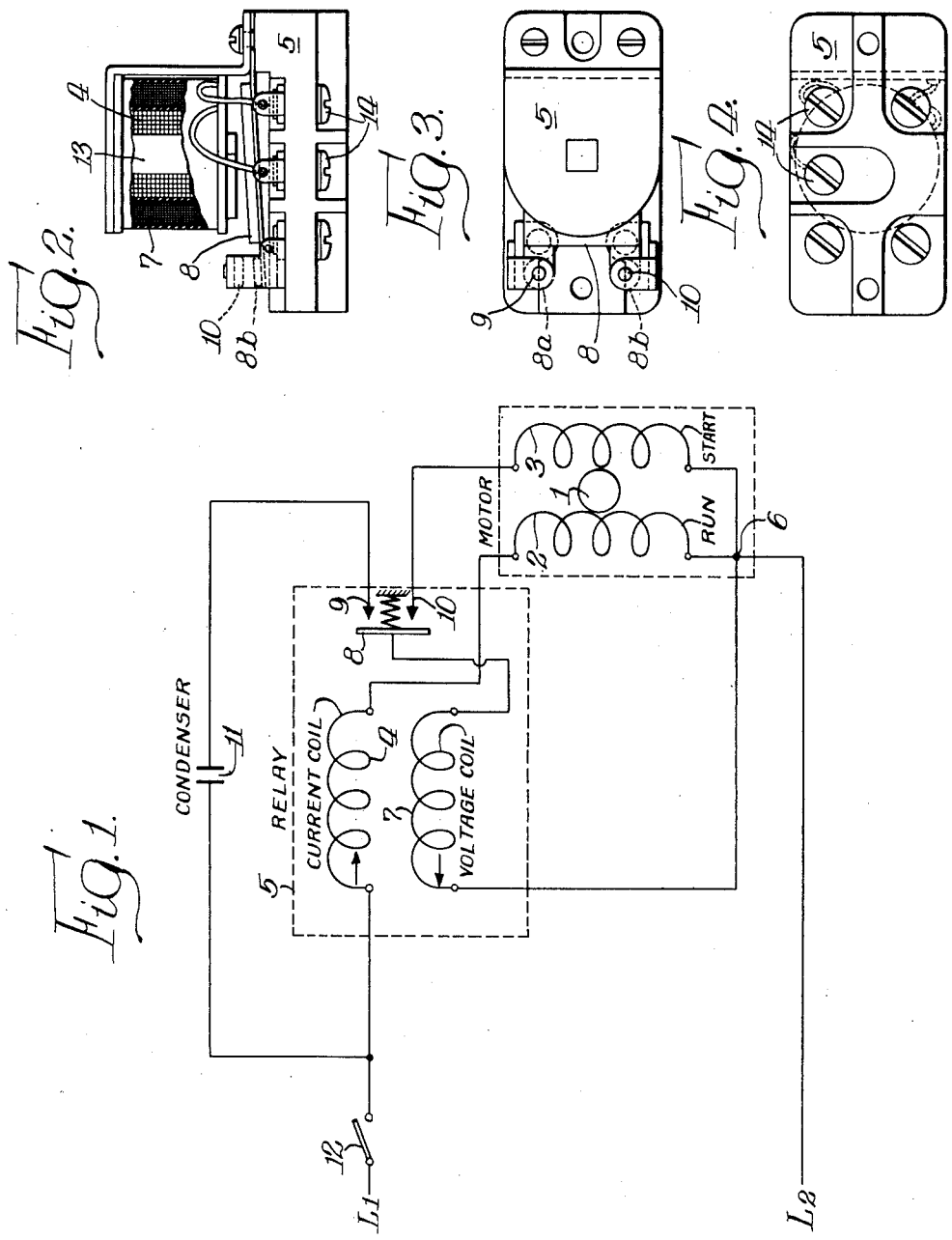

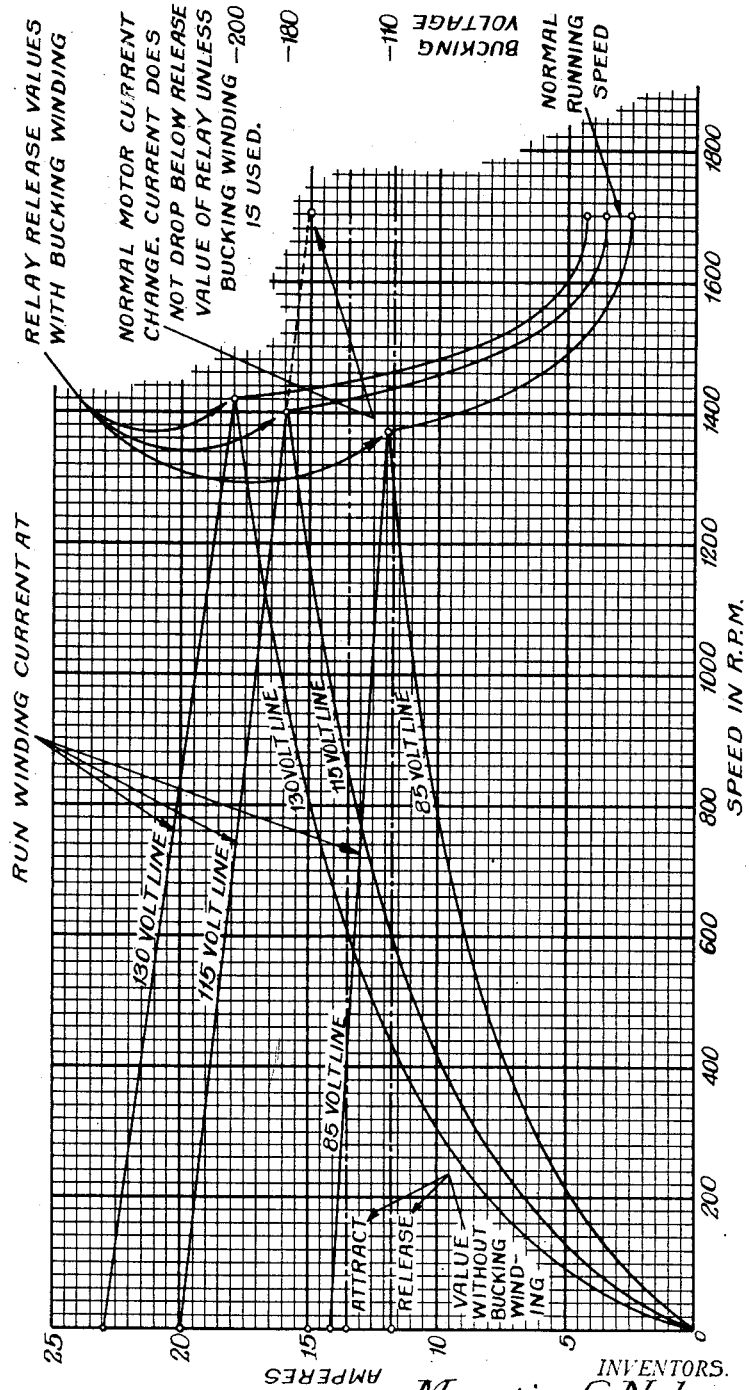

2,512,070

UNITED STATES PATENT OFFICE 2,512,070

MOTOR CONTROL RELAY AND CIRCUIT

Marvin G. Nelsen, Skokie, and Richard S. Acker, Chicago, Ill., assignors to Guardian Electric Manufacturing Co., Chicago, Ill., a corporation of Illinois Application February 11, 1948, Serial No. 7,546

1 Claim. (Cl. 318—221)

The present invention relates to a motor control relay and circuit, and particularly to a control relay and circuit for assisting in starting single phase induction motors of the split phase or condenser start type.

Split phase induction motors or condenser start induction motors are constructed with a main field or "run" winding, and an auxiliary or "start" winding. The start winding may be connected in series with a condenser, whereupon it becomes a condenser start motor, or the condenser may be eliminated, whereupon it is an ordinary split phase induction motor. The start and run windings are connected in parallel.

There has heretofore been proposed a wide variety of apparatus for controlling the operation of such motors to cut the start winding out when the motor reaches its normal running condition. It has, for example, been standard practice to cut out the start winding with a centrifugal switch driven by the motor which opens contacts when the motor reaches running speed. This type of switch is mechanically troublesome and is generally impossible to service without dismantling the motor.

There are also on the market two general types of relays employed in motor control circuits that respond to variations in electrical characteristics of the motor to cut out the starting winding. One type is current operated and is usually a marginal device that must pull up at a low current corresponding to line voltage and release at a relatively high current. This prevents maintaining the relay contacts closed and the starting winding energized when the motor reaches running speed with high line voltage and high load. Such type of relay, however, often fails to release on high line voltage and is apt to open too soon on low voltage.

A second type of relay that is available is a voltage operated device that opens the start circuit when the voltage across the start winding reaches the value corresponding to the running speed of the motor. The principal disadvantage of this type of relay is its tendency to chatter when the motor is turned off due to induced regenerative action between the start and run winding of the motor. This type also requires a relay that has a wide differential between pull in and release values.

A third type of relay is disclosed in the patent to Howard E. Crozier No. 2,429,049, issued October 14, 1947. In the circuit in the Crozier patent, a relay utilizing a current responsive coil and a voltage responsive coil is disclosed. The relay contacts in Crozier are biased toward the closed position, and are open only during full running speed operation of the motor. Furthermore, the current coil of the relay is responsive to the current passing through the capacitor or condenser and the voltage coil is responsive to the voltage across the condenser. In addition, the current coil in Crozier is in the start winding circuit.

Some of the principal disadvantages of the Crozier relay and circuit are as follows. When the motor is stopped, the contacts of the Crozier relay immediately close. Thus, so called phantom circuits are set up due to the regenerative action of the motor with the result that the relay coil in the start winding circuit is energized and may again open the relay contacts, the contacts thereafter immediately closing. This may occur rapidly a number of times before the motor slows down or stops, or in other words, cause contact "chatter." Obviously, this is bad for the relay contacts resulting in defective operation and necessity for too frequent replacement and, incidentally, causes radio interference. Furthermore, unpredictable braking action occurs in the motor, which is bad from the standpoint of the mechanism of the motor.

Another disadvantage of the Crozier circuit is that there is no positive assurance that the relay will cut out the starting winding at about the same speed, regardless of line voltage within practical limits of 85 to 130 volts.

It is an object of the present invention to provide an electrical relay which eliminates the foregoing disadvantages.

It is another object of the invention to provide an electrical relay for the purpose described, which has a current operated coil and a voltage coil connected in such a manner as to oppose the flux produced by the current coil.

It is still another object of the invention to provide a relay with a current and a voltage coil which is adjusted to pull in on the lowest value of current encountered with the motor stalled and to release when the motor reaches running speed.

It is a further object of the invention to provide a relay for the purpose described, which functions substantially independently of line voltage fluctuations.

It is an additional object of the invention to provide improved control for split phase induction motors.

It is still a further object of the invention to provide a novel motor control circuit for single phase induction motors.

It is an additional object of the invention to insure that the relay cuts out the starting winding as soon as the motor comes approximately up to a predetermined speed, regardless of line voltage or motor size, within practical limits; in other words, to insure uniform starting characteristics.

It is an important object of the invention to provide a relay for a motor starting circuit which does not chatter.

With these and other objects in view, the invention consists in the construction, arrangement and combination of the various parts of our device whereby the objects contemplated are attained, as hereinafter more fully set forth, pointed out in the claim, and illustrated in the accompanying drawings, wherein:

Figure 1 is a schematic drawing of a motor starting circuit including a motor and a relay;

Figure 2 is a side elevation of the relay partially in section;

Figure 3 is a top plan view of the relay;

Figure 4 is a bottom view of the relay;

Figure 5 is a graph or chart illustrating the relay characteristics when used with a ⅓ horsepower condenser start split phase motor of the type illustrated diagrammatically in Figure 1.

Figure 6:
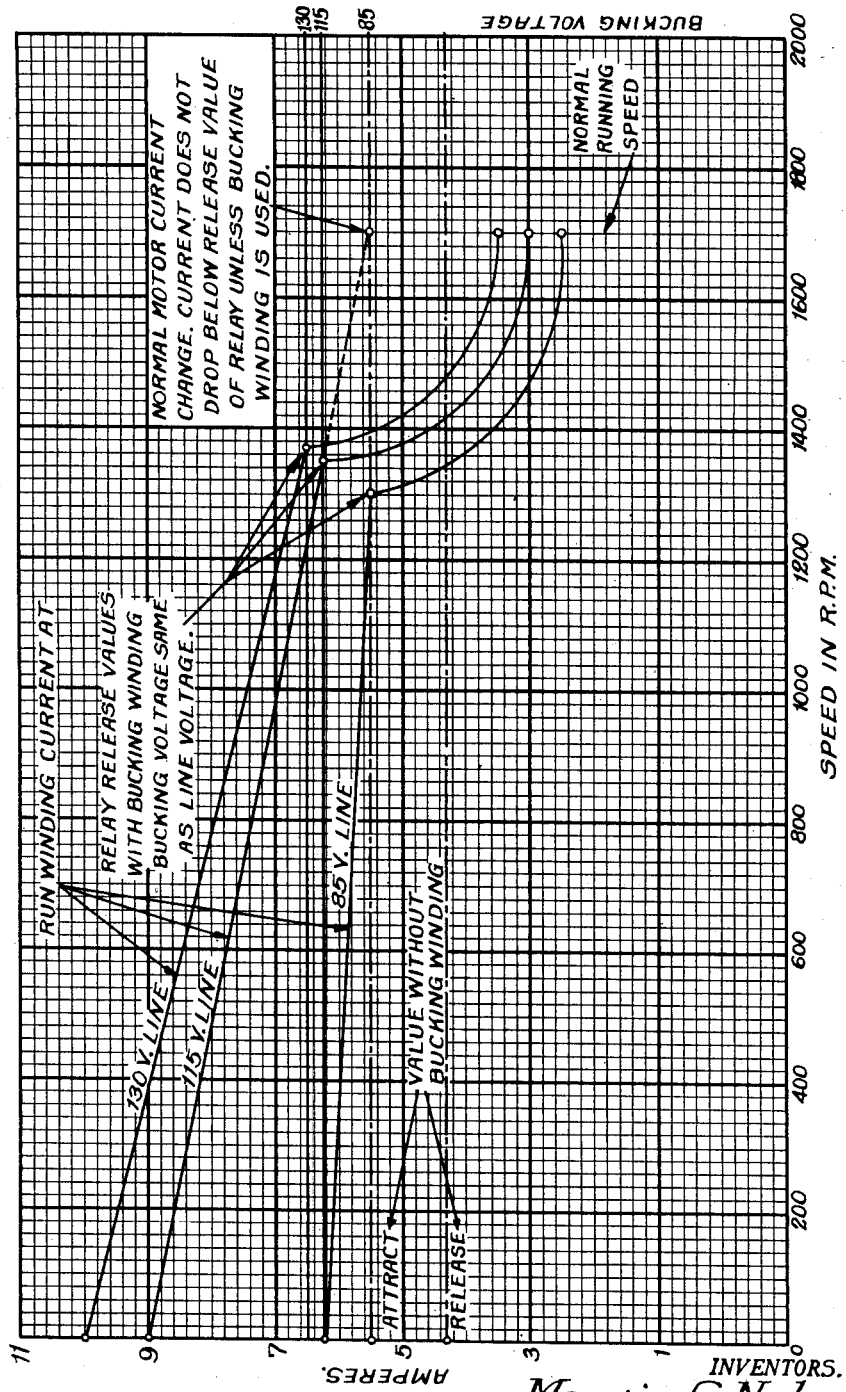
Figure 6 is a graph or chart illustrating the relay characteristics when used with a ⅙ horsepower split phase motor of the type illustrated in Figure 1 without the condenser.

Referring specifically to Figures 1 to 4 of the drawings for a detailed description of the invention, numeral 1 designates the squirrel cage rotor of a single phase induction motor provided with a run winding 2 and a start winding 3 connected together in parallel. The common terminal 6 of the run and start windings is connected to A. C. line L2. The other side of the run winding is connected to one side of a current coil 4 in a relay generally indicated at 5 and the other side of the current coil 4 is connected to A. C. line L1. A voltage coil 7 in relay 5 has one side connected to the run and start winding common terminal 6, while the other side of voltage coil 6 is connected to a movable contact member 8 of relay 5. The movable contact member 8 has two contacts 8a and 8b thereon. It is adapted to be attracted to a core 13, which is subject to the flux produced in both the coils 4 and 7. Two fixed contacts 9 and 10 are provided and are adapted to be engaged by movable contacts 8a and 8b. The contact member 8 is flexible and is biased so that it tends to remain in position to open the contacts 8a—8b and 9—10. Contact 9 is connected to line L1 through a condenser 11, if condenser starting is required. If not, the condenser is eliminated and the remainder of the circuit is unchanged. The other contact 10 is connected to one side of start winding 3. A manual or automatic control switch 12 is provided in line L1 to start and stop the motor. Suitable terminals 14 are provided on the relay 5.

Operation

When control switch 12 is closed, and assuming the motor is at rest, the current coil 4 and run winding 2 are energized. The relay is adjusted to pull in contact member or armature 8 on the lowest value of current through the coil 4 encountered when the motor is stalled. The movable contact 8 then bridges the fixed contacts 9 and 10 and the start winding 3, as well as the voltage coil 7, are energized. As the motor gains speed, the current through current coil 4 drops in value and the voltage across voltage coil 7 increases. The windings are so balanced as to cause the relay to release the contact arm 8 when the motor reaches running speed, thus disengaging the contacts 8 and 9—10 and cutting out the starting winding 3. Since the current through current coil 4 and the voltage across voltage coil 7 are proportional to line voltage variations, the relay functions substantially independently of line voltage fluctuations.

The coils 4 and 7 are so connected that the flux produced in one opposes the flux produced in the other. When the flux of the voltage coil 7 and the flux of the current coil 4 obtain predetermined relationship approaching each other, the relay releases to open contacts 8a—8b and 9—10, thus de-energizing the starting winding 3 and voltage coil 7. The current flow through the current coil 4 during running is insufficient to pull in contact arm 8 and contacts 8a—8b and 9—10, therefore, remain open.

Referring now to the charts, Figures 5 and 6, it is to be noted that in Figure 5, the characteristics for the type of relay just described when used with a ⅓ horsepower condenser start motor is depicted, amperage values of the run winding and, therefore, current coil 4 at different voltages being plotted against speed of the motor on one part of the chart. The amperage values are indicated at the left side of the chart. Another part of the chart depicts the voltage value at various voltages of the bucking or voltage coil 7. The voltages are indicated at the vertical right side of the chart. The attract and release values of the relay without the bucking coil 7 are also indicated. Finally, the chart shows the relay release values with the bucking coil 7 for various voltages and shows the amperage values at normal running speed which for this type of four pole induction motor is about 1700 R. P. M.

From the chart it will be seen that the amperage values for release and attract of the relay without the bucking coil is about 11.75 amperes and 13.5 amperes, respectively. Also that when the motor is stalled, the running winding current is 20 amperes, so that the relay pulls in to close the relay contacts, the bucking voltage being zero. Only values for the 115 volt line will be described because the values for the other line voltages will then be readily apparent. As the motor increases in speed, the running winding current decreases on practically a straight line and the voltage of the bucking coil increases on a curved line starting from zero, due to the condenser start characteristics of the motor. When the current in coil 4 reaches 16 amperes and the voltage in the bucking coil 7 reaches 180 volts, the relay releases and the current falls off rapidly until normal running speed is reached. The voltage in the bucking coil, of course, is immediately zero. It is to be noted that the relay releases at 1400 R. P. M. on the 115 volt line. It releases at 1420 R. P. M. on the 130 volt line and at 1375 R. P. M. on the 85 volt line. This illustrates that the relay operates at substantially the same motor speed regardless of line voltage thus resulting in uniform motor characteristics. It is also to be noted that the normal motor current change does not drop below the release value of the relay unless the bucking winding is used.

Figure 6 is a chart similar to Figure 5 for a ⅙ horsepower split phase motor without condenser starting. In this case, the voltage value of the bucking winding 7 remains constant throughout the speed range of the motor. The current in current coil 4, however, starts at 9 amperes at 115 volts. Thus, the relay contacts are closed. Again, only the characteristics at 115 volts will be described. When the current in coil 4 and in the running winding reaches 6.1 amperes, the relay releases to open the relay contacts and the current in the coil 4 drops off to the normal value at the running speed. It is to be noted that the relay releases at 1350 R. P. M. on a 115 volt line. It releases at 1370 R. P. M. on a 130 volt line and at 1300 on an 85 volt line. Again, motor starting characteristics are substantially uniform regardless of line voltage. Also, it is to be noted that the normal motor current does not drop below the release value of the relay unless a bucking winding is used.

A comparison of the two charts, Figures 5 and 6, also shows that the release of the relay and opening of the starting winding circuit occurs at fairly similar speeds, which illustrates that motor size or characteristics, as well as voltage differences, have very little effect on the speed at which the relay releases.

Some changes may be made in the construction and arrangement of the parts of our device without departing from the real spirit and purpose of our invention, and it is our intention to cover by our claim any modified forms of structure or use of mechanical equivalents which may be reasonably included within its scope without sacrificing any of the advantages thereof.

We claim as our invention:

A relay for controlling a single phase motor having a running winding adapted to be connected to a pair of power lines and a starting winding also adapted to be connected to said power lines in parallel with the running winding, said relay comprising a current coil connected in series with the running winding, a voltage coil adapted to be connected in parallel with the starting winding, a movable armature subjected to the flux produced in both the coils, a contact member movable by the armature, said movable contact member being connected to one side of the voltage coil, a pair of fixed contacts adapted to be engaged and bridged by said movable contact member, one of said fixed contacts being connected to one of said power lines, a capacitance in the circuit between said one fixed contact and the power line to increase the effective voltage in the voltage coil, the other of said fixed contacts being connected to one side of said starting winding, and means for biasing said movable contact member away from said fixed contacts, said armature and fixed contact member being moved upon initial energization of the current coil upon starting the motor to engage said movable and fixed contacts to connect the voltage coil in parallel with said starting winding and to energize said starting winding, said biasing means being effected to disengage said contacts when the flux produced in the current coil is overcome sufficiently by the flux produced in the voltage coil.

MARVIN G. NELSEN.
RICHARD S. ACKER.

REFERENCES CITED

The following references are of record in the file of this patent:

UNITED STATES PATENTS

| Number | Name | Date |
| --- | --- | --- |
| 872,215 | Bliss | Nov. 26, 1907 |
| 910,676 | Hansen | Jan. 26, 1909 |
| 1,147,696 | Woodbridge | July 20, 1915 |
| 1,149,735 | Creveling | Aug. 10, 1915 |
| 1,726,423 | Churcher | Aug. 27, 1929 |
| 1,921,127 | Hutt | Aug. 8, 1933 |
| 1,921,204 | Nickle | Aug. 8, 1933 |
| 1,981,259 | Wertz | Nov. 20, 1934 |
| 2,429,049 | Crozier | Oct. 14, 1947 |
| 2,431,025 | Buell | Nov. 18, 1947 |